United States Patent
Lindberg et al.

(10) Patent No.: US 12,296,516 B2
(45) Date of Patent: May 13, 2025

(54) ACTIVE GRILLE SHUTTER IN-TOOL ASSEMBLY

(71) Applicants: Braendon R. Lindberg, Metamora, MI (US); Magna Exteriors Inc., Concord (CA)

(72) Inventors: Braendon R. Lindberg, Metamora, MI (US); Rosen Rusev, Polvdiv DC (BG); Michael Zorn, Woodbridge (CA)

(73) Assignee: MAGNA EXTERIORS, INC., Aurora (CA)

( * ) Notice: Subject to any disclaimer, the term of this patent is extended or adjusted under 35 U.S.C. 154(b) by 249 days.

(21) Appl. No.: 17/914,416

(22) PCT Filed: May 4, 2021

(86) PCT No.: PCT/US2021/030553
§ 371 (c)(1),
(2) Date: Sep. 26, 2022

(87) PCT Pub. No.: WO2021/226013
PCT Pub. Date: Nov. 11, 2021

(65) Prior Publication Data
US 2023/0106937 A1    Apr. 6, 2023

Related U.S. Application Data (60) Provisional application No. 63/019,643, filed on May 4, 2020.

(51) Int. Cl.
*B29L 31/30* (2006.01)
*B29C 45/00* (2006.01)
(Continued)

(52) U.S. Cl.
CPC ............ *B29C 45/006* (2013.01); *B29C 45/26* (2013.01); *B29C 45/76* (2013.01); *B60K 11/085* (2013.01);
(Continued)

(58) Field of Classification Search
CPC ................. B29C 45/006; B60K 11/085; B29L 2031/3032
See application file for complete search history.

(56) References Cited

U.S. PATENT DOCUMENTS

2006/0092601 A1*  5/2006  Centofante ......... B29C 45/1671
                                                        361/679.31
2013/0223980 A1   8/2013  Pastrick et al.
2019/0184813 A1*  6/2019  Lindberg ................ F24F 13/15

FOREIGN PATENT DOCUMENTS

CA        3078770 A1    4/2019
CA        3084676 A1    8/2019
(Continued)

OTHER PUBLICATIONS

Translation of DE-10161513-A1 (Year: 2002).*
(Continued)

*Primary Examiner* — John J DeRusso
(74) *Attorney, Agent, or Firm* — Warn Partners, P.C.

(57) ABSTRACT

A method of in tool formation and assembly of an active grille shutter system, followed by an automated testing process. The method includes providing a tool having a plurality of sliders that assist in the formation and assembly of the active grille shutter system. The components of the active grille shutter system are individually formed in a single tool, with each of the components being spaced apart from each other. After formation of the components a number of sliders and an end of arm tool push the components together to form the assembled active grille shutter (Continued)

system. The end of arm tool then takes the assembled active grille shutter system to a testing station where the operation is checked.

20 Claims, 9 Drawing Sheets

(51) Int. Cl.
  *B29C 45/26* (2006.01)
  *B29C 45/76* (2006.01)
  *B60K 11/08* (2006.01)
  *B29C 45/14* (2006.01)

(52) U.S. Cl.
  CPC ...... *B29C 45/14* (2013.01); *B29C 2045/2683* (2013.01); *B29C 2945/76903* (2013.01); *B29L 2031/3032* (2013.01); *Y02T 10/88* (2013.01)

(56) References Cited

FOREIGN PATENT DOCUMENTS

| DE | 10161513 A1 | * | 8/2002 | ........... B29C 45/006 |
|----|----|----|----|----|
| DE | 102017106621 A1 | | 10/2018 | |
| DE | 102019109798 A1 | | 10/2020 | |
| EP | 4117885 A1 | | 1/2023 | |
| WO | 2021226013 A1 | | 11/2021 | |

OTHER PUBLICATIONS

Canadian Office Action for Application No. 3,173,932 mailed Apr. 4, 2024.
Notification of Transmittal of the International Preliminary report on Palatability for International Application No. PCT/US2021/030553, Mailed Nov. 17, 2022.

* cited by examiner

ACTIVE GRILLE SHUTTER IN-TOOL ASSEMBLY

FIELD OF THE INVENTION

The present invention relates to develop an active grille shutter assembly and manufacturing process that allows various components to be directly assembled in the injection mold tool after forming the components in the mold tool.

BACKGROUND OF THE INVENTION

Current active grille shutter designs required components to be manufactured, possibly at different locations, and then transferred to a different location for assembly at a location other than in the mold tool. Such a method requires many different steps, transportation storage and even hand assembly of the active grille, all of which would be unnecessary if automated. It is therefore desirable to provide an assembly and manufacturing process where an active grille can be completely assembled in a tool. It is further an object of the invention to provide a method of automatically testing the components of the assembled active grille after removal from the mold tool.

SUMMARY

A process which utilizes specific tooling features and specific component designs that allows for the injection molding and assembly of active grille shutter components automatically and in the same space. The process provides the following benefits. A design that allows for the complete assembly of an active grille shutter system in the space of the injection tool. A design that allows for slider motion to complete the assembly process. An injection mold design of a slider element that has the dual purpose of creating the geometry for the formation of components, such as the end cap and also acting as the assembly nest and assembly force required to assemble the end cap to the frame and vane components. A process which combines specific motion of injection molding sliders that allow for the transformation of function from injection molding of components to aligning the components for assembly.

The process according to the present invention further provides an injection mold design of a slider element that has the dual purpose of creating the geometry for the vane profile and also transforms positions and shape to function as the assembly nest and holder of the vane as it moves and is assembled to the frame and end cap. An injection mold design of a slider element that dual purpose of creating the geometry for the link profile and also transforms positions and shape to function as the assembly nest and force required for the positioning of the link as the vane is assembled through the link into the frame. A vane design that allows for an orientation and spacing between vanes such that there is sufficient space and clearance for injection molding tooling but also allows for the sliding assembly of the vane via vane pivot into the frame and end cap such that when the vanes are rotated, there is no gap between the vanes closing off the air flow. A design that could also allow for the placement of extrusion frame and vane components before injection process that are then over molded to complete the frame section, the final assembly and actuator placement is still carried out by the tool sliders. A design that allows for the placement of extrusion frame and vane components after the injection process that are then pressed together with the injection mold tool sliders to complete the assembly process. The final assembly and actuator placement is still carried out at the same time as the tool sliders are active to create the frame and vane sections. A design that allows for an end of arm tool to place, hold, and test, electrically and mechanically the function. A design that allows for an assembled active grille shutter to be transferred directly from the injection tool to the packaging segment.

The active grille shutter is designed in such a way that the major assembly motion is one direction. This is accomplished by the use of a modular AGS frame design or an extrusion frame and vanes that are placed in an orientation and location where it is possible to both injection mold the geometry and then allows for assembly without losing original positioning. The design allows for the various tool components to function as both injection mold and assembly tool. Examples are the vane designs and placement that allow for the required tooling clearances and spacing, but also function as the nest and retention function during the assembly step. Another example is the geometry associated with the frame construction, it allows for the frame to only be completed after the vanes are inserted, thus fixing the position in the assembly.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments are merely exemplary in nature and are in no way intended to limit the invention, its application, or uses.

Figure 1:
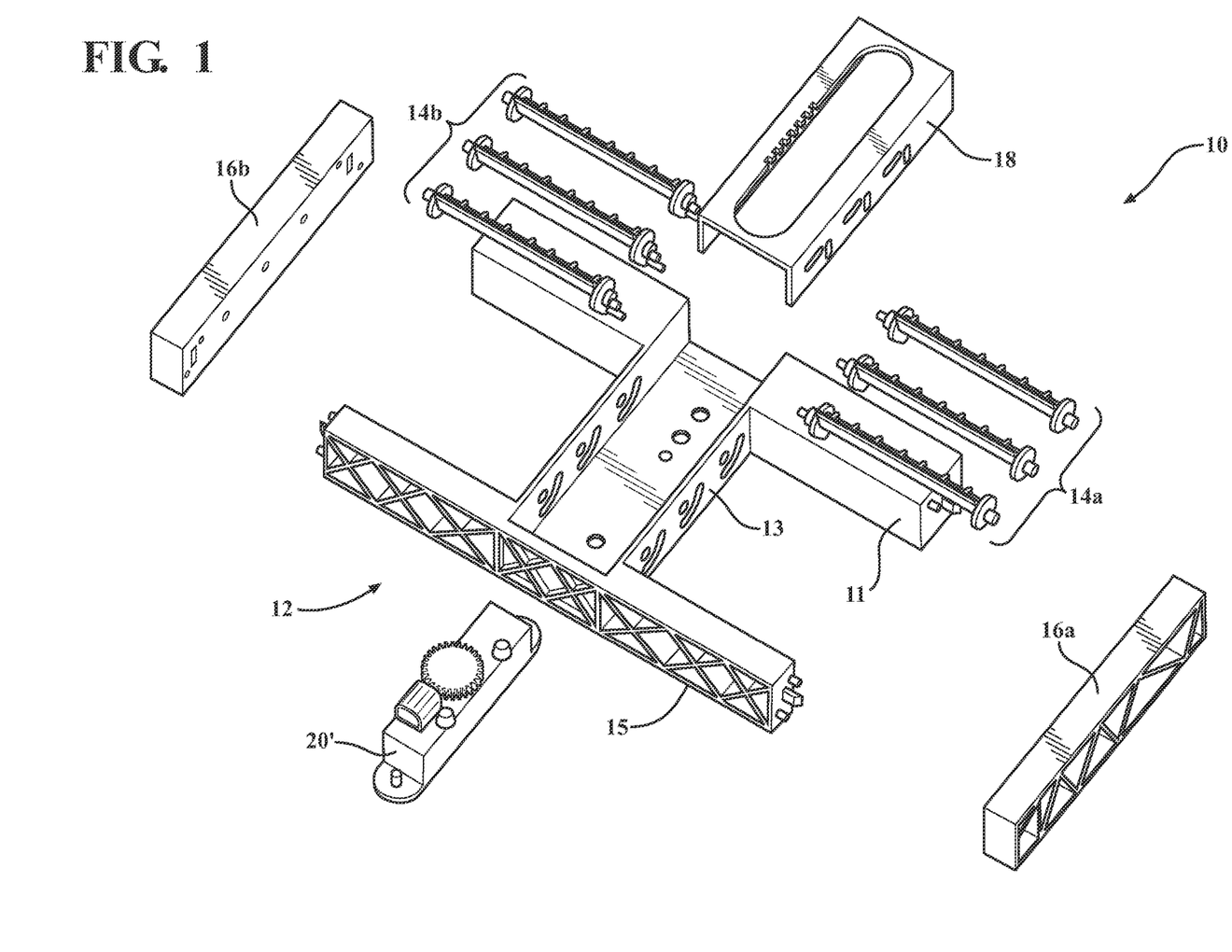
FIG. 1 is an exploded top perspective view of an active grille shutter system.

A method 100 of forming an active grille shutter system 10 is shown and described in the Figures. FIG. 1 shows the details of the active grille shutter system 10 formed using the method 100. The active grille shutter system 10 includes a frame 12, vanes 14a, 14b, end caps 16a, 16b and a link bar 18, all of which, according to one embodiment of the invention, are formed by injection molding within a tool 102 (shown in FIG. 5), which in the current embodiment of the invention is a molding tool capable of forming one or more components of the active grille shutter system 10 by an injection molding process.

The frame 12 as shown is single piece formed by injection molding that has a shape that looks similar to the capital letter "I". While the frame is shown as being formed of a single piece that is injection molded in the tool 102, it is possible for the frame 12 to be formed of multiple pieces that are connected together. For example, the frame 12 has an upper frame portion 11 and a lower frame portion 15 that in some embodiments are separate pieces that connect to the center bar 13 to form the frame 12. The individual pieces can be formed by injection molding or by another process, such as extrusion, and then loaded into the tool 102. The frame further includes a center bar 13 that is used to connect the vanes 14A, 14B with the link bar 18 and the actuator 20. The center bar 13 also creates left and right side apertures of the active grille shutter system 10. However, depending on the design of the active grille 10 the center bar 13 may not be present and the link bar 18 is connected to the vanes at an area adjacent one of the end caps 16a, 16b, with the actuator 20 being connected to one of the end caps 16a, 16b.

The vanes 14a, 14b as shown are formed by injection molding within the tool 102. However, it is within the scope of this invention for the vanes 14a, 14b to be formed by a different method such as extrusion, and then inserted into the tool 102 prior to assembly. The end caps 16a, 16b in a preferred embodiment are formed in the tool 102 by injection molding. The size of the end caps 16a, 16b will dictate how many vanes 14a, 14b are used in a given active grille shutter system 10.

After the above components are either formed or inserted into the tool, an actuator 20 is placed into the frame 12 at the location of the center bar 13. Alternatively, the actuator 20 is placed in the area of one of the end caps 16a, 16b, in embodiments where either a center bar is not used or if a particular design requires the actuation to be at a different location. As described below the placement of the actuator 20 is accomplished using an end arm tool 130 of a robot. The actuator 20 is placed in the center bar 13 prior to assembly of the active grille shutter system 10 to ensure that the vanes 14a, 14b, link bar 28 and actuator 20 are all in proper alignment.

Referring now to FIGS. 2-7 the method 100 includes the providing a tool 102 having two core pieces moveable between a closed and open position, such that one of the at least two core pieces includes an upper core piece 104, a base core piece 106, a left side pusher 126, a right side pusher 128, a left side vane forming surface 127a and a right side vane forming surface 128b. The core pieces also include an upper frame forming portion 116, left side lower forming portion 114, right side lower forming portion 118 and a center slider 124.

Figure 2:
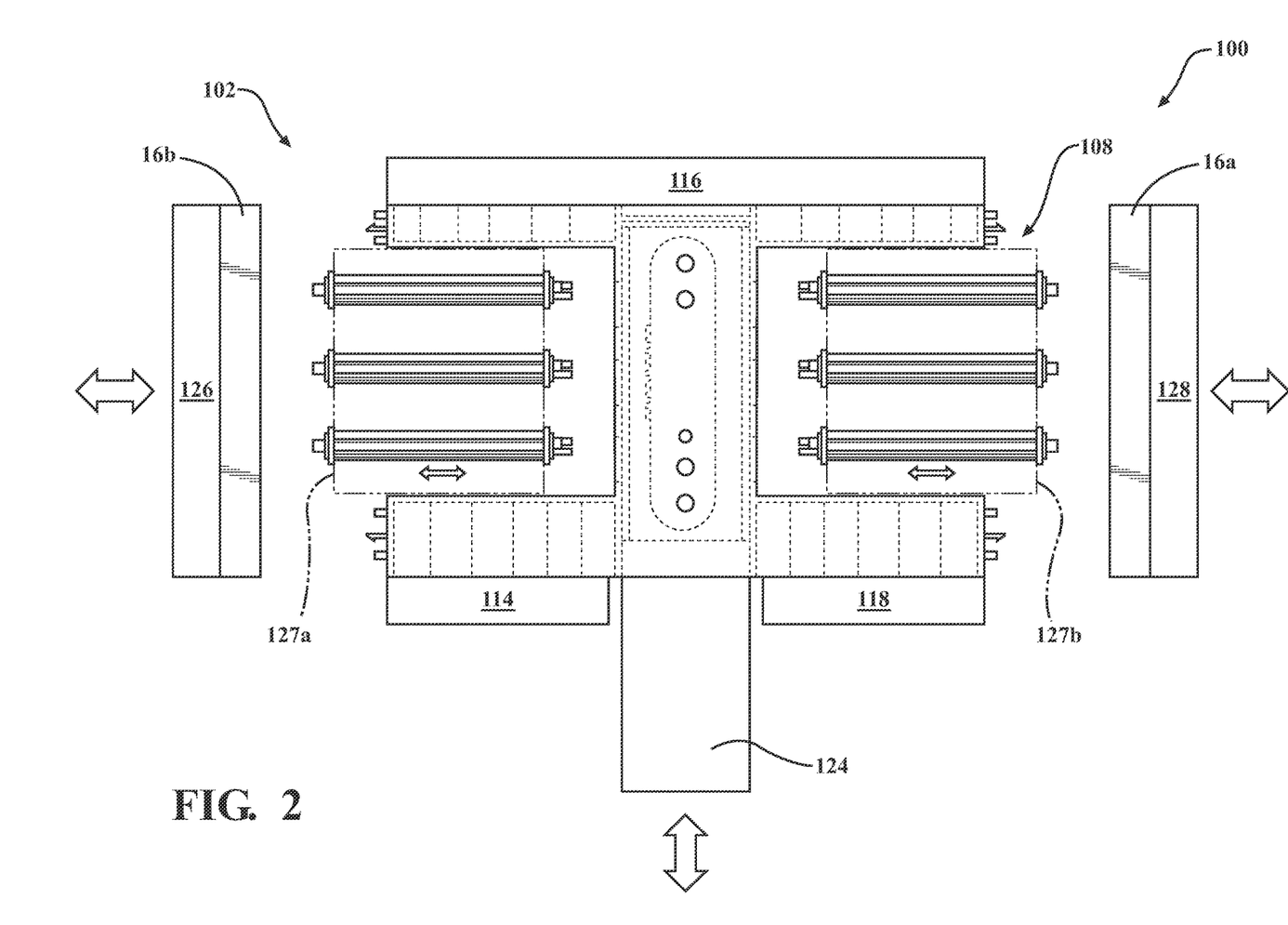
FIG. 2 is a top plan schematic view of a portion of the mold tool used for molding and assembling the active grille shutter system.
Figure 3A:
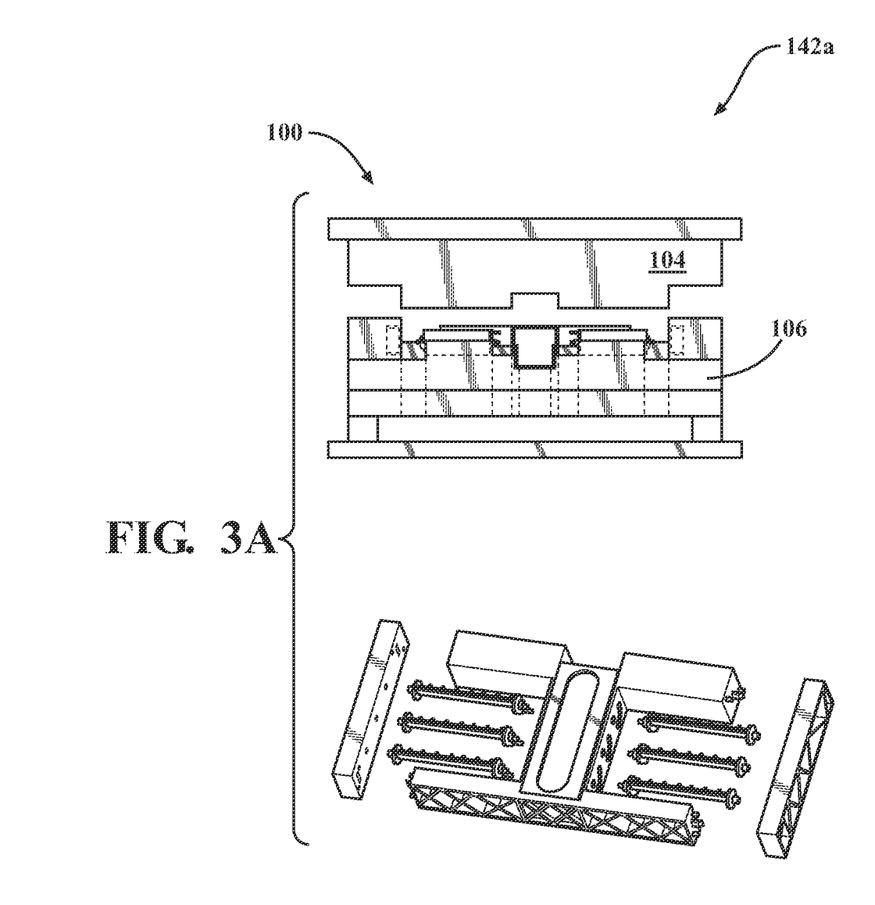
FIG. 3A is a side schematic view with a sectional side view of portions of the active grille shutter system during the steps of assembling the active grille shutter system in the tool.
Figure 3B:
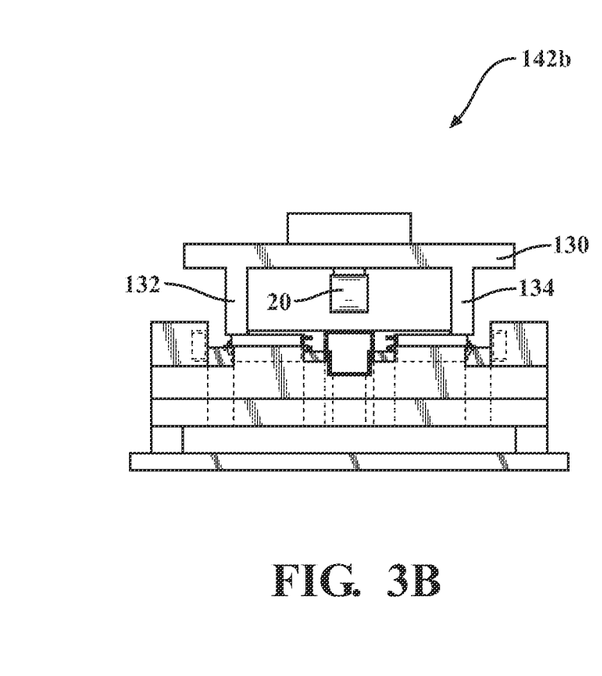
FIG. 3B is a side schematic view with a sectional side view of portions of the active grille shutter system during the step of forming the components of the active grille shutter system in the mold tool.
Figure 3C:
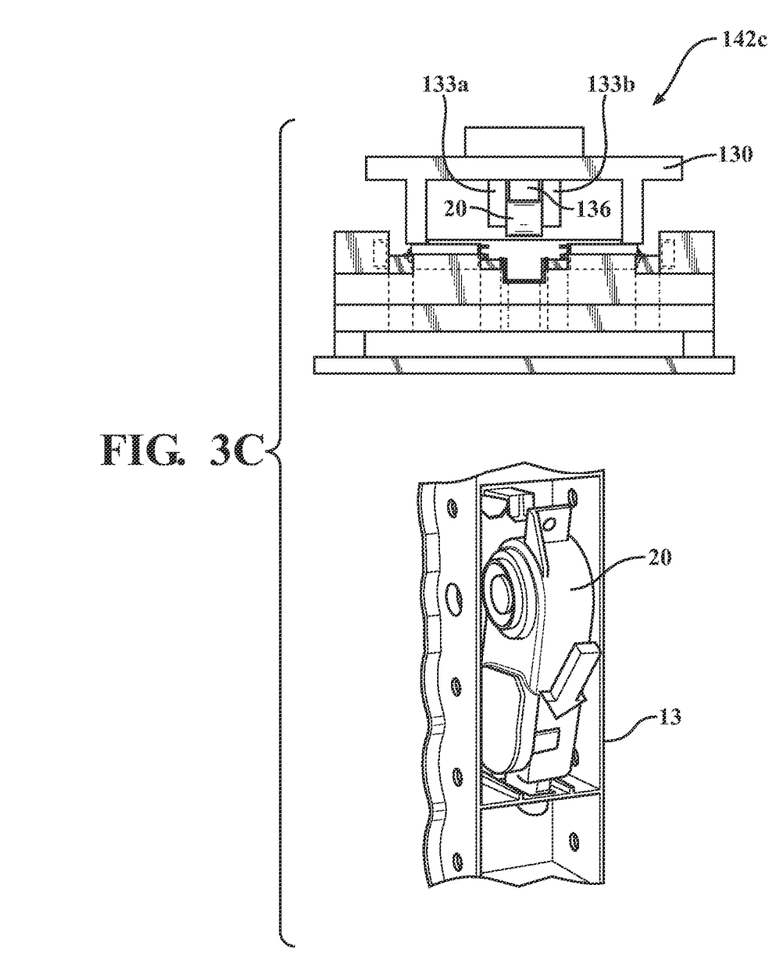
FIG. 3C is a side schematic view with a sectional side view of portions of the active grille shutter system during the step of connecting the actuator to the active grille shutter system in the tool.
Figure 3D:
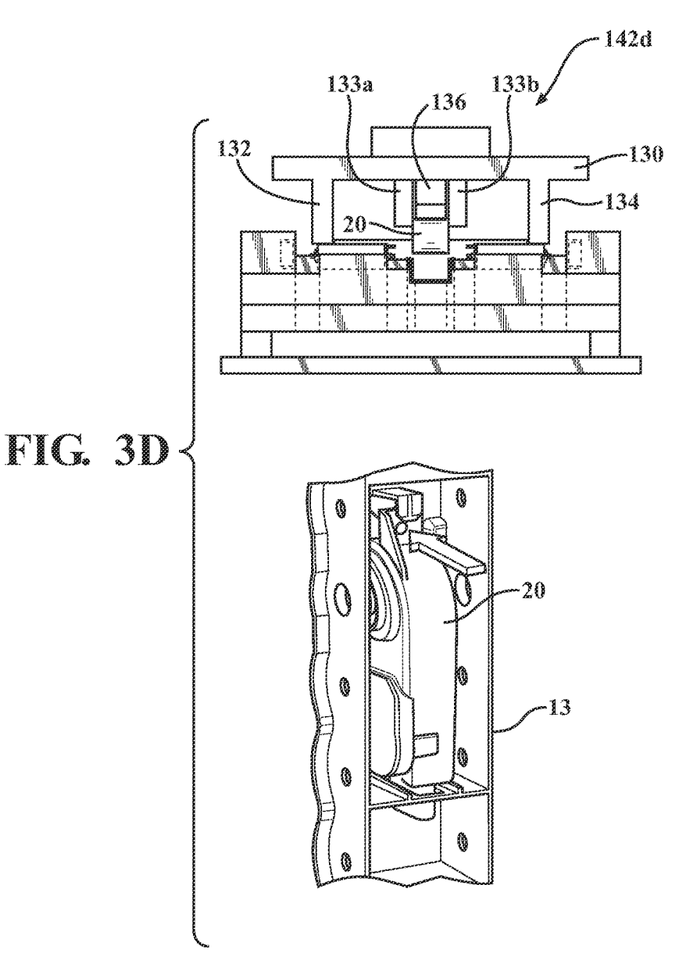
FIG. 3D is a side schematic view with a sectional side view of portions of the active grille shutter system during the step of connecting the actuator to the active grille shutter system in the tool.
Figure 5:
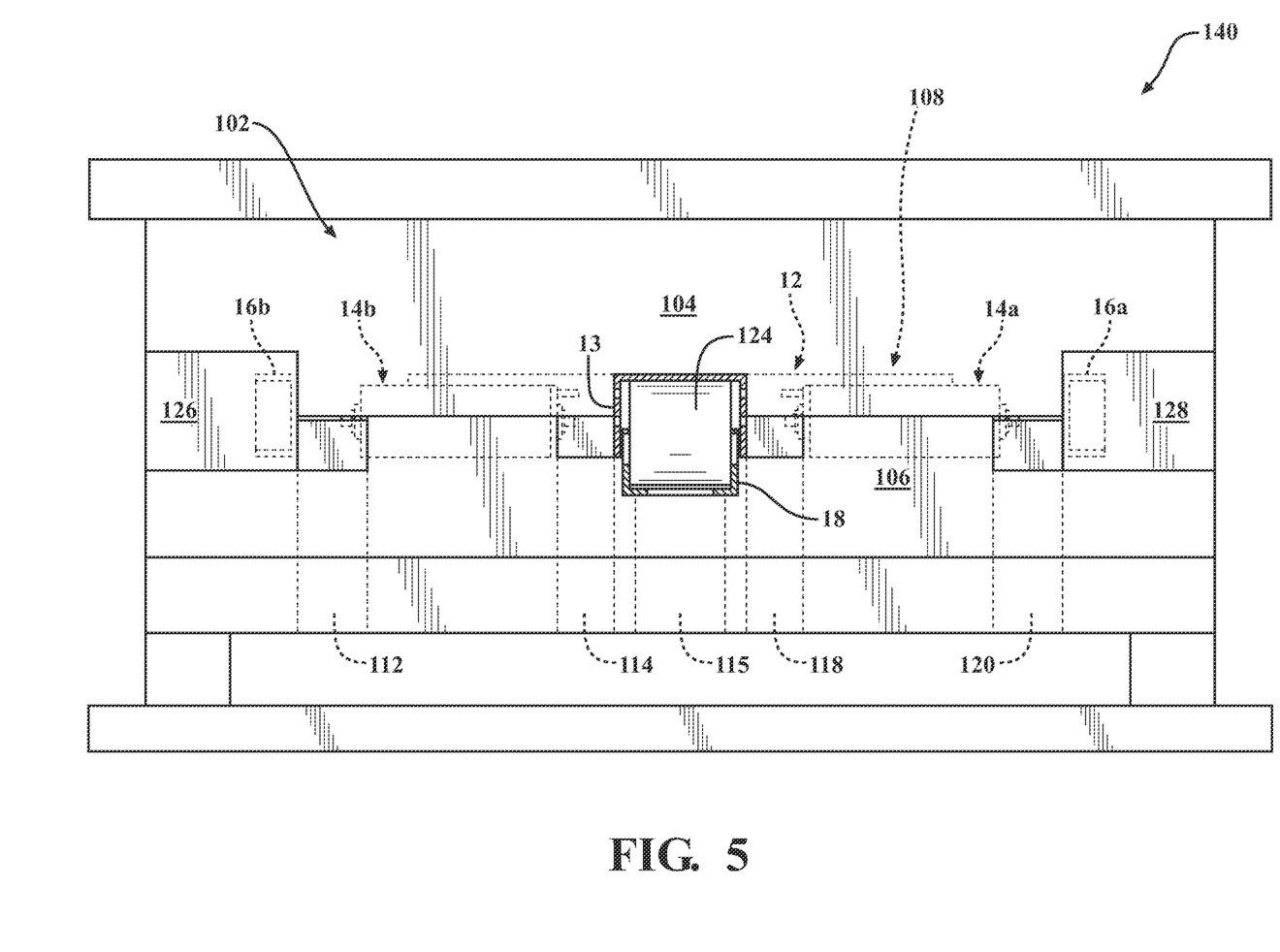
FIG. 5 is a schematic side plan cross-sectional view of the tool and sliders once the mold is closed and the components have been formed, prior to assembly.
Figure 6:
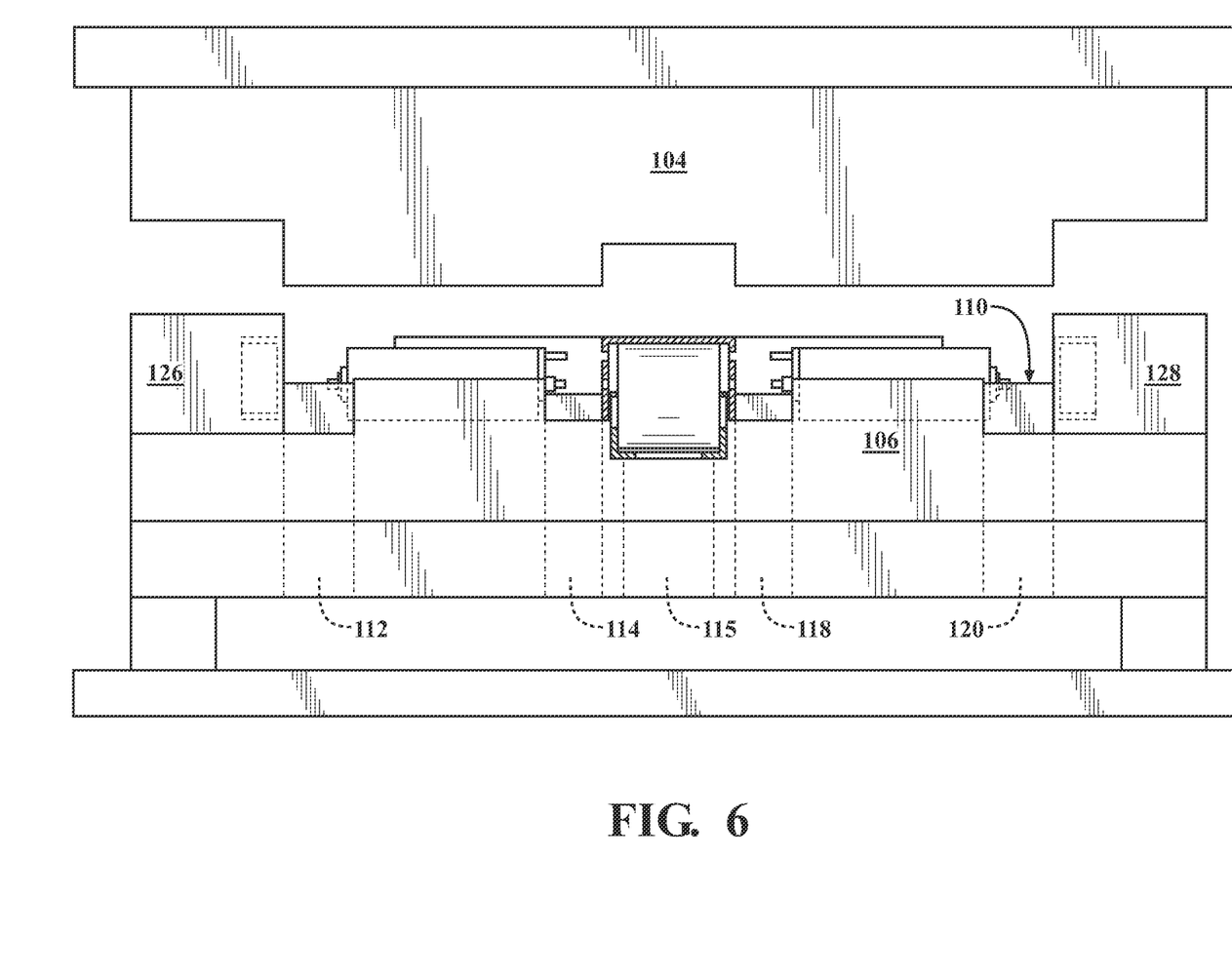
FIG. 6 is a schematic side plan cross sectional view of the tool and sliders once the mold is opened and the components have been formed, prior to assembly.

The core pieces in FIGS. 2 and 5 are shown in the forming position, where the various components of the active grille shutter system 10 will be formed separately in a spaced apart manner in preparation of assembly. However, it is noted that the center slider 124 shown in FIG. 2 is shown in a position were the center slider 124 is slid out of the forming cavity 108 for purposes of illustration. The position of the core pieces in their forming position is more easily shown in FIG. 2 which schematically shows a forming cavity 108 of the tool 102 with the upper core piece 104 and base core piece 106 removed. The forming cavity 108 that defines molding surfaces for forming one or more components of the active grille 10 described above.

As shown the core pieces include four pieces because the left side pusher 126, and right side pusher 128 form part of the forming cavity 108 to form the end caps 16a, 16b. However, using the left side pusher 126 and right side pusher 128 to form the end caps 16a, 16b is optional and it is within the scope of this invention for the core pieces to just include the upper core piece 104 and base core piece 106 for forming all the components of the active grille shutter system 10. In this type of embodiment, the left side pusher 126 and the right side pusher 128 would use only for pushing the components together during assembly.

The formation of the one or more components is accomplished using injection ports (not shown) that connect to the forming cavity 100 so that molten resin is introduced to the forming cavity 108. The base core piece 106 has a forming surface 110 that forms a bottom side of the forming cavity 108 shown in FIGS. 5 and 6. After formation or insertion of the one or more components in the forming cavity 108 the forming surface 110 is where the components are aligned and slidably assembled, which will be described in greater detail below.

The left side pusher 126, right side pusher 128, upper frame forming portion 116, left side lower frame forming portion 114, right side lower frame forming portion 118 and a center bar slider 117 are all movable between forming positions and assembly positions within the forming cavity 108 and in some instances form part of the forming cavity 108 with the base core piece 106. Additionally, several sliders including inner sliders 114, 118, outer slider 112, 120, a center bar pusher 115 and a center slider 124 are moveable into the forming cavity 108 to fill in spaces between the vanes 14b, 14a, center bar 13 and the end caps 16a, 16b during formation to allow each component to be formed separately. The sliders move vertically as shown in FIGS. 2-6, while the center slider 124 moves shown in FIG. 2 and functions to allow formation of the link bar 18 in the forming cavity 10 apart from the formation of the frame 12. After formation of the link bar 18 and frame 12 is complete, the center slider 124 is moved horizontally out of the forming cavity 108 to allow the actuator 20 to be attached at a later step described below.

The method 100 also includes providing an end of arm tool 130 having a plurality of gripping members 132, 134 and an actuator holding member 136, for holding the actuator 20 and positioning and connecting the actuator 20 to the center bar 13 of the frame 12.

The method 100 further includes providing a testing station 136 having an electrical connector 138 capable of supplying power to the actuator 20. As described below the testing station 136 is used to test the assembled active grille shutter assembly 10 to make sure it is working properly. This is an automated step that can be accomplished by having the end of arm tool 130 grab the assembled active grille shutter assembly 10 with the grippers 132, 134 and then move the active grille shutter assembly 10 to the testing station 136, where operation is checked by connecting the actuator 20 with the electrical connection 138, which has a power supply connected thereto.

Referring now to FIGS. 2-7 the steps of the method 100 are schematically shown. At a step 140 (shown in FIG. 5) includes closing the tool 102 by moving the core pieces to the forming position and moving the sliders into the forming cavity 108. During this step inner sliders 114, 118, outer slider 112, 120, center bar pusher 115 and center slider 124 move to a forming position where they are positioned in forming cavity 108 to fill in spaces between where the vanes 14b, 14a, center bar 13 and the end caps 16a, 16b will be formed. The left side pusher 126, right side pusher 128 are moved to a forming position away from where the vanes 14a, 14b are formed so that the left side end cap 16b and right side end cap 16b can be formed using forming surfaces on the respective left side pusher 126 and right side pusher 128. The upper frame forming portion 116, left side lower frame forming portion 114, right side lower frame forming portion 118 and a center bar slider 117 are all movable between to the forming position which is toward the location of where the vanes will be formed, so that the forming surfaces on the upper frame forming portion 116, left side lower frame forming portion 114, right side lower frame forming portion 118 and a center bar slider 117 are used to form the portions of the frame 12, center bar 13 and link bar 18.

Step 140 further includes forming a plurality of one or more components of an active grille shutter system 10 in the forming cavity 108. As shown in FIG. 5, the vanes 14a, 14b, end caps 16a, 16b, frame 12, center bar 13 and link arm 18 are all formed. While the link arm 18 is described as being formed in the tool, it is within the scope of this invention for the link arm 18 to be formed during a separate step and pre-assembled with the actuator 20. This is accomplished by injecting molten resin through ports (not shown) in the tool 102 that are positioned in areas of the forming cavity 108 where the different components are to be formed. As shown in the drawings all of the components of the active grille shutter system 10 are being formed by injection molding.

Referring generally now to FIGS. 2 and 3A-3D the assembly of the active grille shutter system 10 in the mold tool is shown. At steps 142a, 142b, 142c, 143d the mold tool 102 is opened and the end of arm tool 130 is moved into a position above the base core piece 106 for insertion connection of the actuator 20. The end of arm tool 130 has grippers 131a, 131b that are placed into contact with the one or more components, in this case being the vanes 14a, 14b. The end of arm tool 130 also has grippers 133a, 133b that grasp move the link arm 18 out of the way for insertion of the actuator 20, which also occurs during step 142c and step 142d. The actuator 20 is attached to an actuator holding member 136 on the end of arm tool 130. The actuator 20 is aligned into position and then connected to the center bar 13 of the frame 12. There are a couple of different style actuators used in the according to the present invention. The actuator 20' shown in FIG. 1 utilizes a gear that connects to and drive the link arm 18. The actuator 20 shown in FIGS. 3 and 4 connects to one or more drive vanes that connect to the link arm 18. The actuator 20 is connected to snap fittings on the center bar 13 or in another embodiment of the invention the actuator 20 is secured with a fastener. The type of actuator used will depend on the design of a particular application and does not have any bearing on the scope of the method 100 described herein. After connection of the actuator 20, the grippers 133a, 133b then move the link arm 18 into alignment with the actuator 20.

Figure 4A:
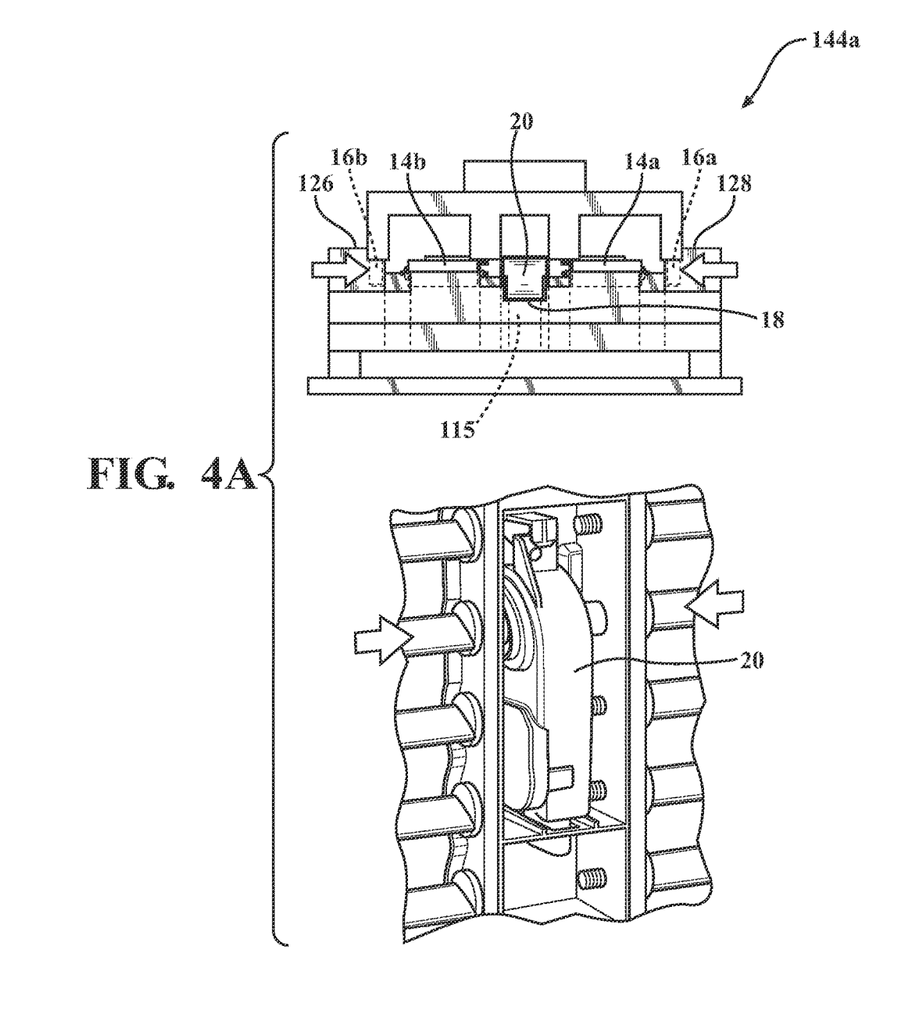
FIG. 4A is a side schematic view of the assembly step with a sectional side view of portions of the active grille shutter system during the steps of assembling the active grille shutter system in the tool.

Once the actuator 20 has been connected at step 144a shown in FIG. 4A the left side pusher 126 and the right side pusher 128 move toward each other across the top of the base core piece 106, the inner sliders 114, 118, the outer slider 112, 120, the center bar pusher 115, the left side vane forming surface 127a, and right side vane forming surface 127b. While pushing the end caps 16a, 16b into engagement with respective vanes 14a, 14b. The left side pusher 126 and right side pusher 128 continue to push the end caps 16a, 16b and vanes 14a, 14b along their respective left side vane forming surface 127a and right side vane forming surface 127b into engagement with the frame 12, center bar 13, link bar 18 and actuator 20. The vanes 14a connect with end cap 16a at one end and the link bar 18 at a second end. The vanes 14b connect with end cap 16b at one end and the link bar 18 at a second end. One of the vanes, which can be any one of the vanes 14a, 14b is a driven vane that connects with both the actuator 20 and the link bar 18 so that driven movement of the driven vane is transmitted through the link bar 18 to all of the other vanes 14a, 14b. Step 144 includes moving the one or more sliders 126, 128 against the one or more components and pushing the one or more components together to form an active grille shutter system 10.

Figure 4B:
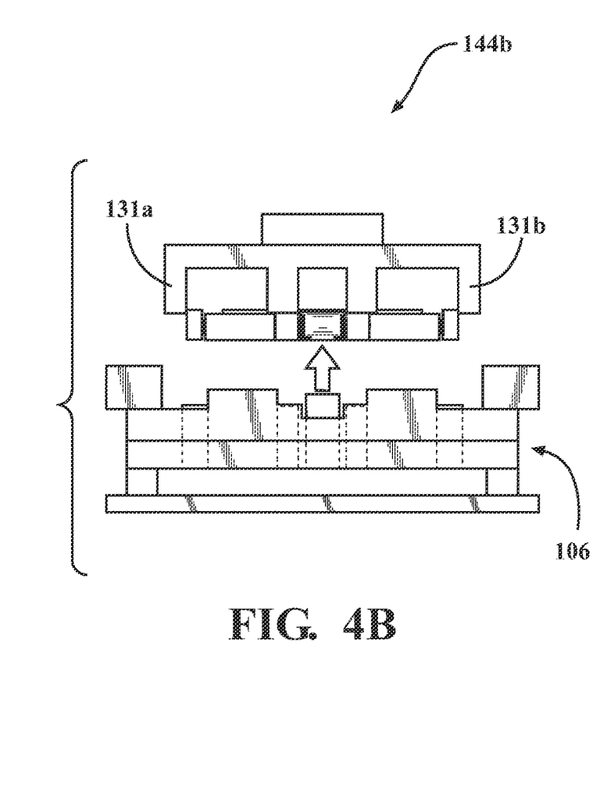
FIG. 4B is a side schematic view of the assembly and removal step.
Figure 4C:
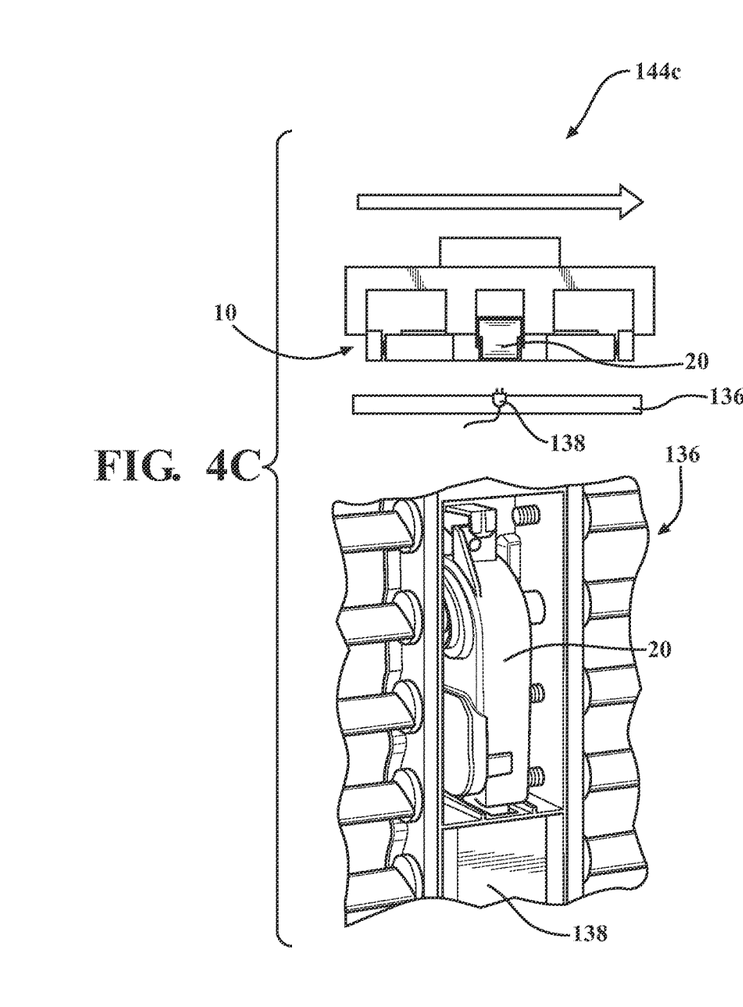
FIG. 4C is a side schematic view with a sectional side view of portions of the active grille shutter system during the testing step.
Figure 4D:
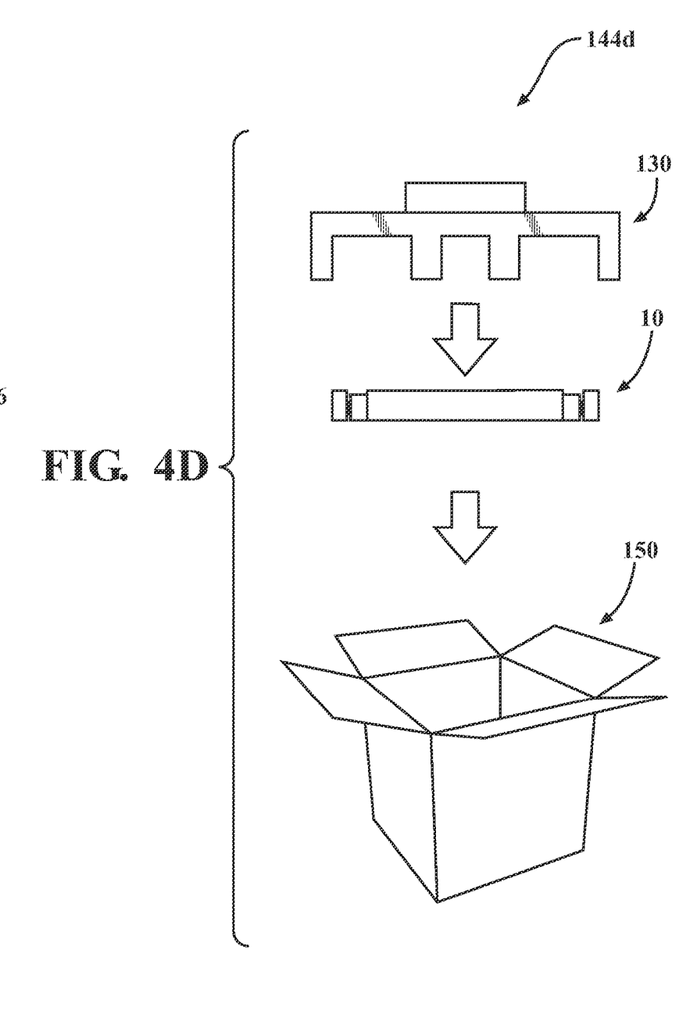
FIG. 4D is a side schematic view of the packing step.

During a step 144b shown in FIG. 4B the end of arm tool 130 uses outside gripping member 131a, 131b hold and raise the active grille shutter system 10 off of the base core piece 106. Simultaneously or sequentially the center bar pusher 115 moves upward in FIG. 4B, to push the center bar 13 of the frame 12 to help release the active grille shutter system 10 from the base core piece 106. The movement of the center bar pusher 115 during step 144b is optional. Also inner sliders 114, 118 and outer sliders 112, 120 can also move to the extended position where they extend upward as shown in FIG. 4B to push on portions of the frame 12 to help release the active grille shutter system 10 from the base core piece 106. At step 144c, shown in FIG. 4C the end of arm tool 130 moves the active grille shutter system 10 to a testing station 136. At the testing station 136 the actuator 20 is connected to the electrical connector 138 and the operation of the active grille shutter system is checked prior to being packed for shipping or assembly to a vehicle. At step 144d, shown in FIG. 4D the active grille shutter system 10 is moved using the end of arm tool 130 to a shipping container 150.

Figure 7:
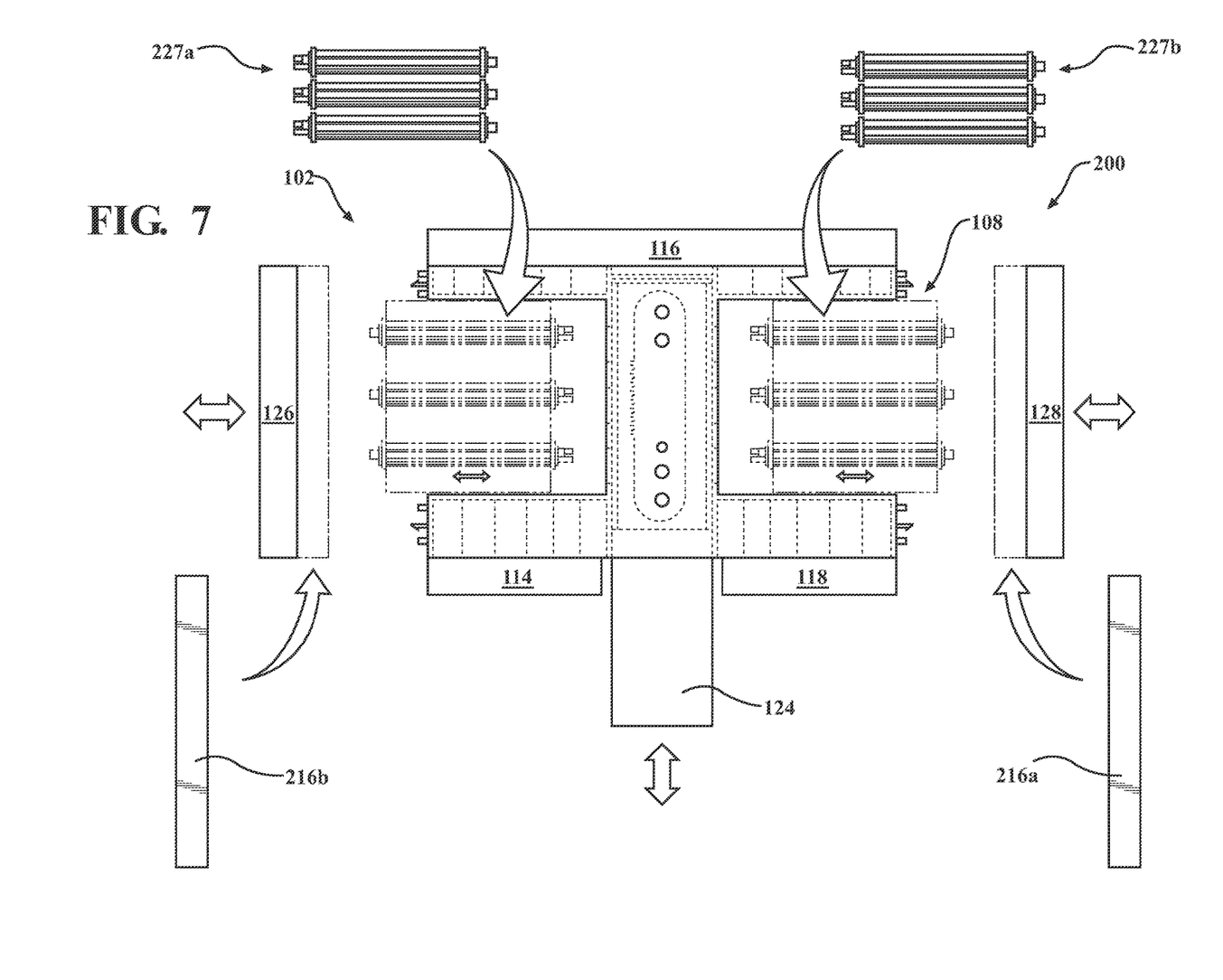
FIG. 7 is a top plan schematic view of a portion of the mold tool used for molding and assembling the active grille shutter system according to an alternate embodiment of the invention.

Referring now to FIG. 7 a method 200 according to an alternate embodiment of the invention is now described. In the method 200 the some of the components of the active grille shutter system are formed during a different process and then inserted into the mold tool 102 prior to forming some of the components of the active grill shutter system by injection molding. According to the method 200 at least two of the plurality of components are preformed components, in this case vanes 227a, 227b and optionally end caps 216a, 216b that are preformed using another process such as an extrusions, compression molding or even a separate injection molding step. The preformed components are inserted into the tool 102 prior to the step of closing the tool 102. The step 140 of forming the components shown in FIG. 5 is modified so that preformed components are not formed, but rather remain in the tool 102 until assembly of the active grille shutter system using the steps shown in FIGS. 3A-3D and 4A-4D described above. While the preformed components are shown in the present embodiment are the vanes 227a, 227b, left side end cap 216b and right side end cap 216a, it is within the scope of this embodiment for portions of the frame to also be pre-formed. For example the center bar 13, upper frame portion 11 and the lower frame portion 15 could all be formed by extrusion or some other process and then be inserted into the tool.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of forming an active grille shutter system comprising the steps of:
    providing a tool having at least two core pieces moveable between a closed position and an open position wherein when the at least two core pieces are in the closed position a forming cavity is formed that defines molding surfaces for forming a plurality of components of the active grille shutter system, wherein the at least two core pieces include a base core piece that forms part of the forming cavity;
    providing one or more pushers each having a forming surface that forms part of the forming cavity and are moveable between a forming position and an assembly position;
    closing the tool and moving the at least two core pieces to the closed position and the one or more pushers to the forming position;
    forming the plurality of components of the active grille shutter system in the forming cavity; and
    moving the one or more pushers to the assembly position where the one or more pushers move against the plurality of components and push the plurality of components together to form the active grille shutter system.

2. The method of forming the active grille shutter system of claim 1 further comprising the steps of:
    providing a plurality of sliders that are moveable between a forming position and an extended position, and
    wherein during the forming of the plurality of components of the active grille shutter system in the forming cavity, the plurality of sliders are in the forming position so that the plurality of sliders are positioned inside of the forming cavity to fill spaces between the plurality of components.

3. The method of forming the active grille shutter system of claim 1 further comprising the steps of:
    providing an actuator;
    providing an end of arm tool having an actuator holding member, and
    connecting the actuator to the actuator holding member of the end of arm tool;
    inserting the actuator into one of the plurality of components using the end of arm tool and releasing the actuator from the actuator holding member.

4. The method of forming the active grille shutter system of claim 3 further comprising the steps of:
    providing a testing station with an electrical connector, and
    holding the active grille shutter system with a plurality of gripping members on the end of arm tool;
    moving the active grille shutter system off of the base core piece with the end of arm tool;
    moving the active grille shutter system to the testing station, and
    connecting the actuator to the electrical connector at the testing station and performing a test of the active grille shutter system.

5. The method of claim 4 further comprising the steps of:
    providing a plurality of sliders that are moveable between a forming position and an extended position;
    wherein during the forming of the plurality of components of the active grille shutter system in the forming cavity, the plurality of sliders are positioned in the forming position so that the plurality of sliders are positioned inside of the forming cavity to fill spaces between the plurality of components;
    grasping the active grill shutter system with the plurality of gripping members of the end of arm tool, and
    wherein the step of moving the active grille shutter system off of the base core piece with the end of arm tool further includes moving the plurality of sliders to the extended position to assist with moving the active grille shutter system off the base core piece by pushing on the active grille shutter system.

6. The method of forming an active grille shutter system of claim 1 further comprising the steps of:
    providing one or more preformed components;
    inserting the one or more preformed components into the tool prior to the step of closing the tool.

7. The method of forming an active grille shutter system of claim 6 wherein the one or more preformed components include one or more selected from a group consisting of an upper frame portion, a lower frame portion, and one or more vanes.

8. The method of claim 7 wherein the one or more preformed components are formed during a separate extrusion step outside of the tool.

9. A method of forming an active grille shutter system comprising the steps of:
    providing a tool having at least two core pieces moveable between a closed position and an open position wherein when the at least two core pieces are in the closed position a forming cavity is formed that defines molding surfaces for forming a plurality of components of the active grille shutter system, wherein the at least two core pieces include a base core piece that forms part of the forming cavity;
    providing one or more pushers each having a forming surface that forms part of the forming cavity and are moveable between a forming position and an assembly position;
    providing an end of arm tool having a plurality of gripping members and an actuator holding member for holding an actuator;
    providing a testing station having an electrical connector capable of supplying power to the actuator;
    closing the tool and moving the at least two core pieces to the closed position and the one or more pushers to the forming position;
    forming the plurality of components of the active grille shutter system in the forming cavity;
    opening the tool and moving the end of arm tool with the actuator attached to the actuator holding member into position over the plurality of components and placing the plurality of gripping members into contact with at least one of the plurality of components, wherein the end of arm tool also connects the actuator to one of the plurality of components when the end of arm tool contacts the plurality of components;

moving the one or more pushers against the plurality of components and pushing the plurality of components together to form the active grille shutter system;

holding the active grille shutter system with the plurality of gripping members;

moving the end of arm tool with the active grille shutter system attached off of the base core piece, and using the end of arm tool to transfer the active grille shutter system to the testing station and connecting the actuator of the active grille shutter system to the electrical connector and performing a test of an operation of the active grille shutter system.

10. The method of forming an active grille shutter system of claim 9 further comprising the steps of:

providing one or more preformed components;

inserting the one or more preformed components into the tool prior to the step of closing the tool.

11. The method of forming an active grille shutter system of claim 10 wherein the one or more preformed components include one or more selected from a group consisting of an upper frame portion, a lower frame portion, and one or more vanes.

12. The method of claim 11 wherein the one or more preformed components are formed during a separate extrusion step outside of the tool.

13. The method of claim 9 further comprising the steps of:

providing a plurality of sliders connected to the base core piece that are moveable between a forming position and an extended position;

wherein during the forming of the plurality of components the plurality of sliders are positioned in the forming position so that the plurality of sliders are positioned inside of the forming cavity to fill spaces between the plurality of components;

grasping the active grille shutter system with the plurality of gripping members of the end of arm tool, and wherein the step of moving the end of arm tool with the active grille shutter system attached off of the base core piece further includes moving the plurality of sliders to the extended position to assist with moving the active grille shutter system off the base core piece by pushing on the active grille shutter system.

14. A method of forming an active grille shutter system comprising the steps of:

providing a tool having at least two core pieces moveable between a closed position and an open position wherein when the at least two core pieces are in the closed position a forming cavity is formed that defines molding surfaces for forming a plurality of components of the active grille shutter system, the plurality of components include an upper frame portion, lower frame portion, left side end cap, right side end cap, a plurality of vanes and a link bar, wherein the at least two core pieces include an upper core piece and a base core piece that form part of the forming cavity;

providing a left side pusher and a right side pusher that are adjacent the base core piece that are capable of moving in and out of the forming cavity, wherein the left side pusher has a forming surface that forms part of the left side end cap and once the left side end cap is formed the left side pusher is contactable with the left side end cap to contact and move the left side end cap on a forming surface of the base core piece and the right side pusher has a forming surface that forms part of the right side end cap and once the right side end cap is formed the right side pusher is contactable with the right side end cap to contact and move the right side end cap on the forming surface of the base core piece;

closing the tool;

forming the plurality of components of the active grille shutter system in the forming cavity; and opening the tool;

moving the left side pusher against the left side end cap and pushing the left side end cap to connect with the plurality of vanes, the upper frame portion and the lower frame portion and simultaneously moving the right side pusher against the right side end cap and pushing the right side end cap to connect with the plurality of vanes, the upper frame portion and the lower frame portion, wherein all of the plurality of vanes connect to the link bar.

15. The method of forming the active grille shutter system of claim 14 further comprising the steps of:

wherein the plurality of components include a center bar with an actuator mounting surface;

providing an actuator;

providing an end of arm tool having an actuator holding member, connecting the actuator to the actuator holding member of the end of arm tool;

wherein prior to moving the left side pusher and the right side pusher the end of arm tool with the actuator is moved over the active grille shutter system and connects the actuator to the actuator mounting surface and to at least one of the plurality of vanes.

16. The method of forming an active grille shutter system of claim 15 further comprising the steps of:

providing a plurality of gripping members on the end of arm tool;

providing a testing station having an electrical connector capable of supplying power to the actuator, and gripping the active grill shutter system with the plurality of gripping members of the end of arm tool and moving the end of arm tool with the active grille shutter system to the testing station and connecting the actuator of the active grille shutter system to the electrical connector to perform a test operation of the active grille shutter system.

17. The method of claim 16 further comprising the steps of:

providing a plurality of sliders connected to the base core piece that are moveable between a forming position and an extended position;

wherein during the forming of the plurality of components the plurality of sliders are positioned in the forming position so that the plurality of sliders are positioned inside of the forming cavity to fill spaces between the plurality of components;

grasping the active grill shutter system with the plurality of gripping members of the end of arm tool, and wherein the step of moving the end of arm tool with the active grille shutter system to the testing station includes moving the plurality of sliders to the extended position to assist with moving the active grille shutter system off the base core piece by pushing on the active grille shutter system.

18. A method of forming an active grille shutter system comprising the steps of:

providing a tool having at least two core pieces moveable between a closed position and an open position wherein when the at least two core pieces are in the closed position a forming cavity is formed that defines molding surfaces for forming a left side end cap, a right side end cap, and a link bar, wherein the at least two core pieces include an upper core piece and a base core piece that form part of the forming cavity;

providing a left side pusher and a right side pusher that are adjacent the base core piece that are capable of moving in and out of the forming cavity, wherein the left side pusher has a forming surface that forms part of the left side end cap and once the left side end cap is formed the left side pusher is contactable with the left side end cap to contact and move the left side end cap on a forming surface of the base core piece and the right side pusher has a forming surface that forms part of the right side end cap and once the right side end cap is formed the right side pusher is contactable with the right side end cap to contact and move the right side end cap on the forming surface of the base core piece;

providing a plurality of preformed components;

inserting the preformed components into the tool;

closing the tool;

forming the left side end cap, the right side end cap, and the link bar of the active grille shutter system in the forming cavity; and opening the tool; and moving the left side pusher against the left side end cap and pushing the left side end cap to connect with the plurality of preformed components and simultaneously moving the right side pusher against the right side end cap and pushing the right side end cap to connect with the plurality of preformed components.

19. The method of forming an active grille shutter system of claim 18 wherein the plurality of preformed components include one or more selected from a group consisting of an upper frame portion, a lower frame portion, and a plurality of vanes.

20. The method of forming an active grille shutter system of claim 18, wherein the plurality of preformed components are formed during a separate extrusion step outside of the tool.

* * * * *